United States Patent [19]
Crone et al.

[11] Patent Number: 5,153,782
[45] Date of Patent: Oct. 6, 1992

[54] PROCESS FOR THE COINCIDENT DEFLECTION OF LIGHT OF DIFFERING WAVELENGTHS

[75] Inventors: Klaus P. Crone, Hennef; Detlef Rose, Bergisch Gladbach; Edmund Schmitz; Udo Schlossarek, both of Leverkusen; Franz Hoffacker, Langenfeld, all of Fed. Rep. of Germany

[73] Assignee: Agfa Gevaert AG, Leverkusen, Fed. Rep. of Germany

[21] Appl. No.: 811,179

[22] Filed: Dec. 19, 1991

[30] Foreign Application Priority Data
Dec. 22, 1989 [DE] Fed. Rep. Germany ......... 3942461

[63] Related U.S. Application Data
Continuation-in-part of Ser. No. 624,412, Dec. 7, 1990, abandoned.

[51] Int. Cl.5 .............................................. G02B 27/00
[52] U.S. Cl. ................................... 359/896; 359/285; 359/305; 359/618; 359/900
[58] Field of Search ............... 359/896, 196, 618, 629, 359/630, 634, 638, 639, 204, 285, 287, 298, 305, 900; 250/251, 281, 210

[56] References Cited

U.S. PATENT DOCUMENTS

| | | | |
|---|---|---|---|
| 3,240,548 | 3/1966 | Biessels | 359/618 |
| 3,588,324 | 6/1971 | Marie | 359/634 |
| 4,448,494 | 3/1984 | Freyre | 359/285 |
| 4,460,250 | 7/1984 | Freyre et al. | 359/305 |

*Primary Examiner*—Loha Ben
*Attorney, Agent, or Firm*—Connolly & Hutz

[57] ABSTRACT

A process for a common deflection of at least two light beams having different wavelengths, wherein the deflection is carried out by means of an acousto-optical crystal, is characterized in that color-dependent beam dividers and deflection units are inserted in the beam path of the, at least two, light beams of different colors in such a way that deflection angles are compensated by properly adjusted longer beam paths, so that all beams coincide at a predetermined distance from the deflecting crystal.

3 Claims, 1 Drawing Sheet

PROCESS FOR THE COINCIDENT DEFLECTION OF LIGHT OF DIFFERING WAVELENGTHS

CROSS-REFERENCE TO RELATED APPLICATIONS

This application is a continuation-in-part of application Ser. No. 624,412, filed Dec. 7, 1990, now abandoned.

TECHNICAL FIELD

The invention relates to a process for the common deflection of light of differing wavelengths, in particular laser light.

The invention also relates to a process for the application of random latent characters in at least two different colours onto a photosensitive material, which is sensitized for the, at least two, different colours, by means of laser light, wherein the characters become visible in different colours during development of the photosensitive material.

The invention relates, in particular, to the application of the characters onto moving strip-form material of the above-mentioned type.

The laser light required for the process according to the invention is consequently composed of at least two laser light sources of different colours.

BACKGROUND OF THE INVENTION

A copier is known from DE-OS 33 42 758, by means of which a photosensitive product is provided with latent images composed of letters, numerals, symbols, markings or the like. This apparatus contains an oscillator which emits a laser beam; a device which modulates the laser beam as it passes through; a device which deflects the modulated laser beam according to its angular position for scanning the surface of a photosensitive product in a direction lying perpendicularly to the direction in which the photosensitive product is continuously moving; a device which selectively adjusts patterns of letters, numerals, symbols and the like from which the latent images are to be provided on the photosensitive product and which simultaneously generates signals according to the selectively adjusted patterns; a device which senses a portion of the photosensitive product moved according to the signal-generating device and by a device which controls the modulating device by means of the signals from the device adjusting and sensing the patterns for providing the necessary latent images at predetermined points on the photosensitive product.

Even if the photosensitive material according to the prior art is a colour photographic material, latent images which are of different colours during development cannot be produced in this way.

If the laser oscillator of the prior art is replaced by at least two laser oscillators being combined to emit laser light of different components with different colours and if a colour photographic material containing at least one respective photosensitive layer for each of the colours is used, latent images of different colours can be achieved. The laser light, composed of at least two components of different colours, has to be deflected in a controlled way, so that the desired characters and patterns are written on the photosensitive material. If for this controlled deflection acousto-optical crystals are used, the different colours of the laser light are deflected at different angles, so that the characters and patterns written by each laser component do not exactly overlap on the photographic material. The result is unsatisfactory e.g. because of coloured edges of the characters.

SUMMARY OF THE INVENTION

An object of the invention is, during the common deflection of at least two light beams having different wavelengths, wherein the deflection is carried out by means of an acousto-optical crystal to provide means which cause the at least two light beams which are deflected at different angles owing to their different wavelengths to be made coincident again at a predetermined distance from the light source.

A further object of the invention is to provide a process for the application of random latent characters onto a photosensitive material which is sensitized for at least two different colours by means of laser light composed of at least two laser beams of different colours, the latent characters becoming visible in different colours during development of the photosensitive material, which does not have the above-mentioned disadvantage.

DETAILED DESCRIPTION OF THE INVENTION

These objects are achieved by inserting colour-dependent beam dividers and mirrors in the beam path of the at least wo light beams of different colours such that smaller deflection angles are compensated by properly adjusted longer beam paths, so that all beams coincide at a predetermined distance from the deflecting crystal.

When using acousto-optical crystals for the deflection of light beams, in particular laser light beams, the angles of deflection are a few degrees as a function of the crystal properties and the light wavelengths.

When using red light having a wavelength of 633 nm and blue light having a wavelength of 488 nm and a distance between the point of coincidence and the light source of 0.4 m, the blue light as to pass through an additional path of about 12 cm as the deflection stroke for the blue light is 1.1° and the angle of deflection for the red light 1.4°.

Beam dividers which, for example, reflect the light and allow red light to pass are known.

Figure 1:
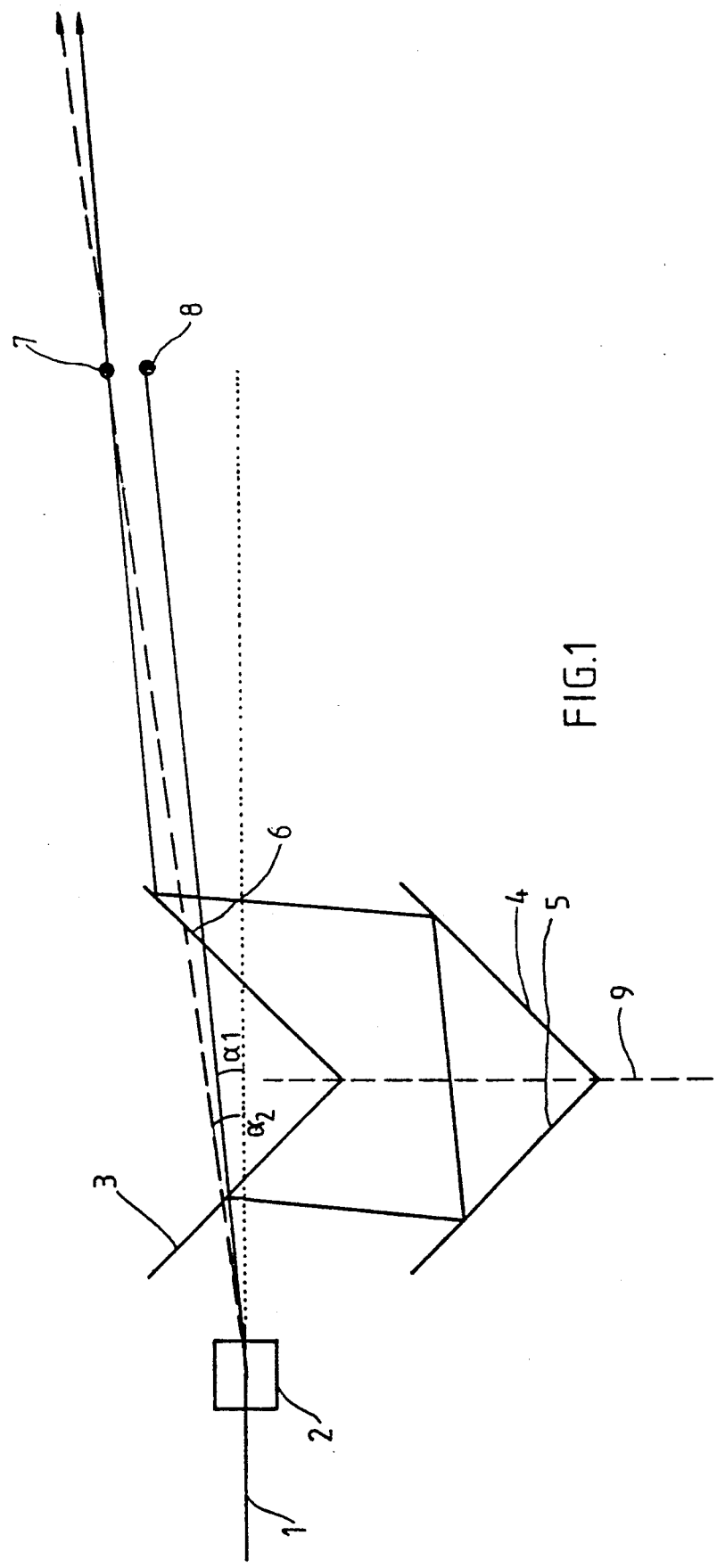
FIG. 1 shows the beam path for the process according to the invention.

(1) designates a laser light composed of a red component having a wavelength of 633 nm and a blue component having a wavelength of 488 nm. The two laser beams having different wavelengths are deflected at different angles ($\alpha_1$, $\alpha_2$) by an acousto-optical crystal (2). One of the two beams would impinge at point (7) and the other at point (8). Due to reflection at the beam divider (3), at the mirrors (4, 5) and at the beam divider (6), the light beam with the smaller deflection now describes a predeterminable longer path so that is also incident at point (7).

As the coincidence of the two beams at a predetermined distance from the crystal only depends on the properly adjusted difference in path length, the beams are coincident even if the deflection angles vary according to the writing of characters and patterns. So the pathlength of the beam with the smaller deflection angle has not to be controlled, but has only to be adjusted once.

The two beams are coincident only at point (7), i.e., at a definite distance from the deflecting crystal (2). This distance depends on the mutual position of the pair of mirrors (4, 5) relative to the pair of beam dividers (3, 6). Should it for any reason be necessary to shift the point of coincidence nearer to or further from the crystal, this can easily be done by shifting the pair of mirrors (4, 5) along the line (9) relative to the pair of beam dividers (3, 6). Thereby the length of the detour of the beam with the smaller deflection angle is adjusted properly, so that the two beams coincide at the desired distance from the crystal.

In the same way, three and more light beams having different wavelengths can be deflected in common and in coincidence.

The process according to the invention has the advantage that the common and coincident deflection of light beams having different wavelengths can be carried out with simple and inexpensive components, as the conceivable alternative of providing an individual deflecting crystal for each light beam would be substantially more complicated, would give rise to higher costs and, in many cases, could not be implemented for reasons of space.

If the process according to the invention is used to apply to a colour photographic material latent graphical symbols at the material margin, which become visible in different colours during development, then the colours of the laser beams preferably lie in the regions of the spectrum for which the photosensitive material is sensitized.

We claim:

1. Process for a common deflection of at least two light beams having different wavelengths, wherein the deflection is carried out by means of an acousto-optical crystal, characterized in that colour-dependent beam dividers and mirrors are inserted in the beam of at the at least two light beams of different colours in such a way that smaller deflection angles are compensated by properly adjusted longer beam paths, so that all beams coincide at a predetermined distance from the deflecting crystal.

2. Process for applying random latent characters onto a photosensitive material, which is sensitized for at least two different colours, by means of laser light composed of at least two laser beams of different colours, said latent characters becoming visible in different colours during development of the photosensitive material, characterized in that colour-dependent beam dividers and mirrors are inserted in the beam path of the at least two laser beams of different colours in such a way that smaller deflection angles produced by a deflecting crystal are compensated by properly adjusted longer beam paths, so that all beams coincide at a predetermined distance from the deflecting crystal.

3. Process according to claim 2, characterized in that the colours of the laser beams lie in the regions of the spectrum to which the photosensitive material is sensitive.

* * * * *